(12) United States Patent      (10) Patent No.:   US 12,670,313 B1

Crump             (45) Date of Patent:     Jun. 30, 2026

(54) MODERATING COMMENTS WITH ADAPTIVE TRUST AND BIAS DETECTION

(71) Applicant: NewsGenie, Inc., Mesa, AZ (US)

(72) Inventor: Jeffrey Don Crump, Mesa, AZ (US)

(73) Assignee: NewsGenie, Inc., Mesa, AZ (US)

( * ) Notice: Subject to any disclaimer, the term of this patent is extended or adjusted under 35 U.S.C. 154(b) by 0 days.

(21) Appl. No.: 19/242,370

(22) Filed: Jun. 18, 2025

(51) Int. Cl.
| | |
|---|---|
| *G06F 40/166* | (2020.01) |
| *G06F 40/20* | (2020.01) |
| *G06Q 10/40* | (2026.01) |
| *H04L 51/02* | (2022.01) |
| *H04L 51/52* | (2022.01) |

(52) U.S. Cl.
CPC ............ *G06F 40/166* (2020.01); *G06F 40/20* (2020.01); *G06Q 10/40* (2026.01); *H04L 51/02* (2013.01); *H04L 51/52* (2022.05)

(58) Field of Classification Search
CPC ....... G06Q 50/01; G06F 40/166; G06F 40/20; H04L 51/52; H04L 51/02
See application file for complete search history.

(56) References Cited

U.S. PATENT DOCUMENTS

| | | | | |
|---|---|---|---|---|
| 11,573,995 B2 * | 2/2023 | Vargas | .................. | G06F 16/383 |
| 12,001,489 B1 * | 6/2024 | Malur Srinivasan | ........................ | |
| | | | | G06F 16/9035 |
| 12,417,413 B2 * | 9/2025 | Platten | ................. | G06F 40/279 |
| 2014/0280540 A1 * | 9/2014 | Wurtele | ............... | G06Q 10/103 |
| | | | | 709/204 |

| | | | | |
|---|---|---|---|---|
| 2015/0195295 A1 * | 7/2015 | Sandler | ................. | G06F 16/951 |
| | | | | 726/26 |
| 2016/0188597 A1 * | 6/2016 | Moore | .................... | H04L 51/52 |
| | | | | 707/749 |
| 2017/0124468 A1 * | 5/2017 | Bolshinsky | ........... | G06F 16/435 |
| 2017/0142044 A1 * | 5/2017 | Ball | ...................... | G06Q 30/02 |
| 2017/0250939 A1 * | 8/2017 | Bohm | ................... | H04L 67/535 |
| 2018/0018149 A1 * | 1/2018 | Cook | ........................ | G06F 8/70 |
| 2019/0297042 A1 * | 9/2019 | Prabhu | ................. | H04L 51/212 |
| 2020/0250268 A1 * | 8/2020 | Travis | .................. | G06F 40/151 |
| 2020/0311202 A1 * | 10/2020 | Zhang | .................. | H04L 51/216 |
| 2021/0119951 A1 * | 4/2021 | Santos | ................. | G06F 40/284 |
| 2022/0182346 A1 * | 6/2022 | Yarnall | .................. | H04L 51/52 |
| 2022/0368658 A1 * | 11/2022 | Soman | .................. | G06F 3/0481 |
| 2023/0004940 A1 * | 1/2023 | Cheng | ............... | G06Q 10/1053 |
| 2023/0032159 A1 * | 2/2023 | Kalinichenko | ..... | H04L 12/1831 |
| 2023/0105483 A1 * | 4/2023 | Rittman | ................. | G06Q 30/08 |
| | | | | 705/37 |
| 2024/0289649 A1 * | 8/2024 | Saha | ...................... | G06N 5/022 |
| 2024/0311558 A1 * | 9/2024 | DiMarco | ............. | G06F 16/9536 |

(Continued)

*Primary Examiner* — Tadesse Hailu

(74) *Attorney, Agent, or Firm* — Esplin & Associates, PC

(57)             ABSTRACT

Methods, systems, and devices for moderating comments with adaptive trust and bias detection are described. In some implementations, a user comment associated with a user profile may be received and analyzed for sentiment and bias against predefined bias categories. If no bias is detected, the comment may be posted to a platform, and a trust score associated with the user profile may be updated based on predefined trust score rules. If bias is detected, the comment may be flagged, a bias-free version of the comment may be generated, and the trust score may be updated based on predefined trust score reduction rules. User privileges associated with the user profile may be adjusted based on the updated trust score, enabling dynamic moderation and fostering constructive engagement.

20 Claims, 12 Drawing Sheets

(56)         References Cited

U.S. PATENT DOCUMENTS

| | | | |
|---|---|---|---|
| 2025/0103913 A1* | 3/2025 | Branson ................. | G06N 5/022 |
| 2025/0232124 A1* | 7/2025 | Rodgers ................. | G06F 40/30 |
| 2025/0335699 A1* | 10/2025 | Sanderson ............ | G06F 40/295 |

* cited by examiner

INTERACTIVE COMMENT MODERATION WITH ADAPTIVE SUGGESTIONS AND
USER REDEMPTION MECHANISM

FROM

200

UPDATE TRUST SCORE
AND COMMENT & OFFENSE
COUNTS

POST BIAS/HATE-FREE
ALTERNATIVE
COMMENT
OR
CANCEL COMMENT

FROM

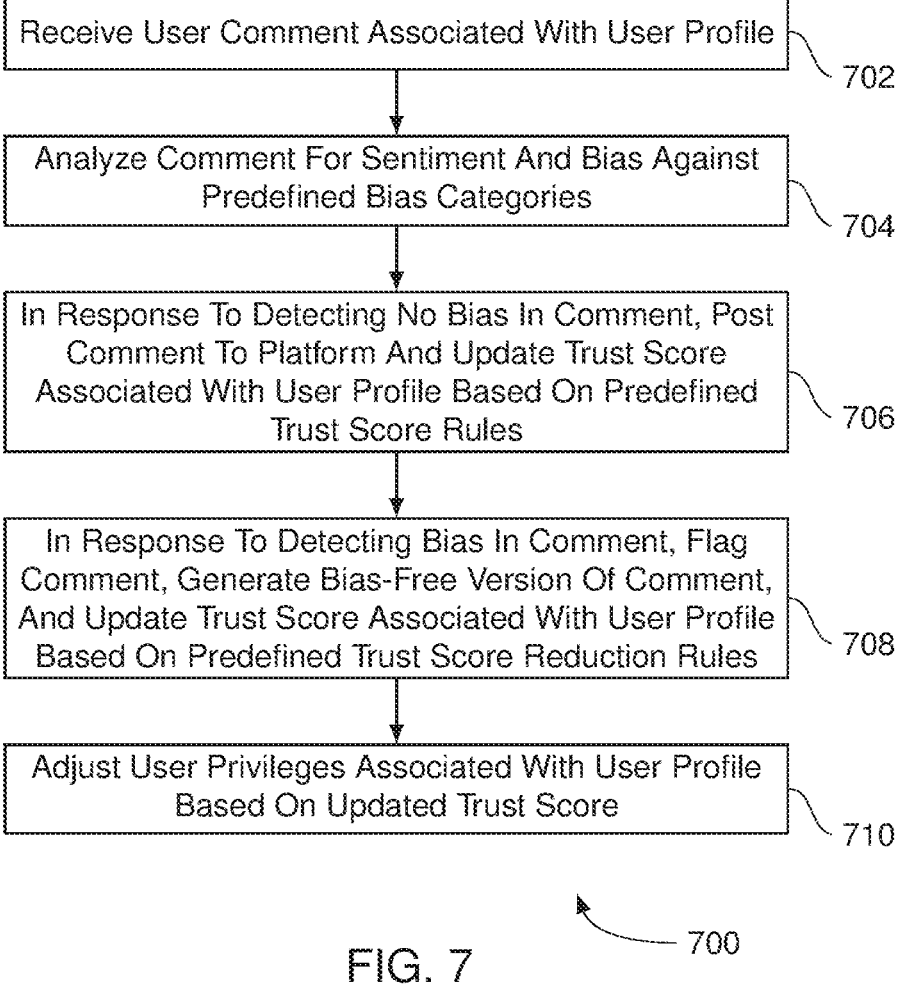

Receive User Comment Associated With User Profile — 702

Analyze Comment For Sentiment And Bias Against Predefined Bias Categories — 704

In Response To Detecting No Bias In Comment, Post Comment To Platform And Update Trust Score Associated With User Profile Based On Predefined Trust Score Rules — 706

In Response To Detecting Bias In Comment, Flag Comment, Generate Bias-Free Version Of Comment, And Update Trust Score Associated With User Profile Based On Predefined Trust Score Reduction Rules — 708

Adjust User Privileges Associated With User Profile Based On Updated Trust Score — 710

FIG. 7                    700

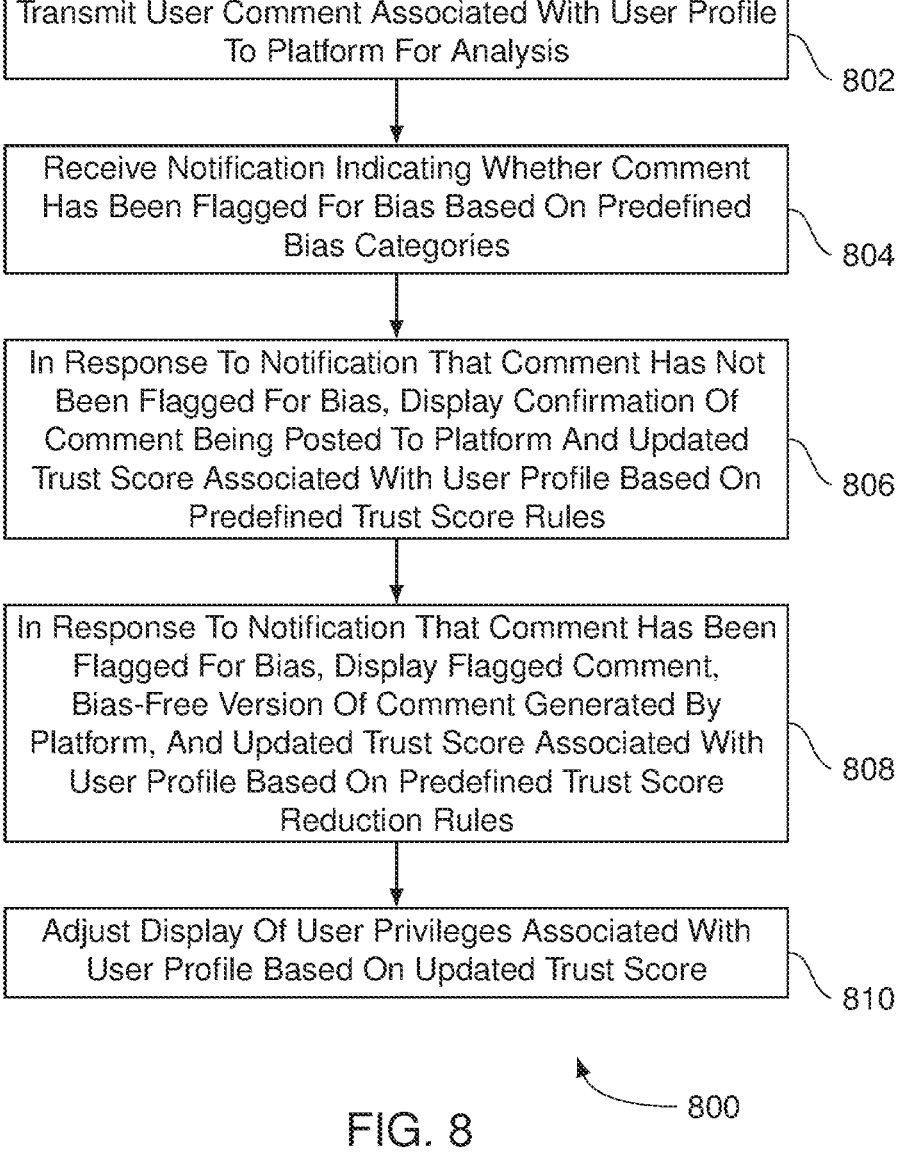

Transmit User Comment Associated With User Profile To Platform For Analysis ⟍ 802

Receive Notification Indicating Whether Comment Has Been Flagged For Bias Based On Predefined Bias Categories ⟍ 804

In Response To Notification That Comment Has Not Been Flagged For Bias, Display Confirmation Of Comment Being Posted To Platform And Updated Trust Score Associated With User Profile Based On Predefined Trust Score Rules ⟍ 806

In Response To Notification That Comment Has Been Flagged For Bias, Display Flagged Comment, Bias-Free Version Of Comment Generated By Platform, And Updated Trust Score Associated With User Profile Based On Predefined Trust Score Reduction Rules ⟍ 808

Adjust Display Of User Privileges Associated With User Profile Based On Updated Trust Score ⟍ 810

FIG. 8          ⟍— 800

MODERATING COMMENTS WITH ADAPTIVE TRUST AND BIAS DETECTION

FIELD OF TECHNOLOGY

The present disclosure relates generally to database systems and data processing, and more specifically to moderating comments with adaptive trust and bias detection.

BACKGROUND

Online platforms that facilitate user-generated content may rely on comment sections to encourage interaction and engagement among users. These platforms often utilize automated systems to analyze and manage user comments, employing tools such as sentiment analysis and content categorization.

SUMMARY

The described techniques relate to improved methods, systems, devices, and apparatuses that support techniques for moderating comments with adaptive trust and bias detection. Some implementations may introduce an interactive comment moderation system that leverages advanced sentiment analysis and bias detection algorithms to dynamically assess user comments. By categorizing violations into key bias areas—such as hate speech, racism, sexism, and political extremism—the system may ensure precise identification of harmful content. Comments flagged for violations may either be removed or transformed into bias-free versions, allowing users to choose between accepting the modified version or canceling their comment. This approach may minimize the spread of harmful language while preserving user engagement.

To further enhance compliance, some implementations may incorporate an adaptive trust and reputation mechanism that adjusts user privileges based on their behavior. Users may begin with a high trust score, which may increase through positive actions, such as receiving upvotes or completing educational modules. Conversely, repeated violations may result in trust score reductions, limiting commenting privileges. The system may also provide educational resources tailored to specific bias categories, helping users understand the impact of their behavior and offering practical guidance for constructive participation.

Additionally, some implementations may include an automated comment responder that generates unbiased, conversational replies to user comments. This feature may foster engagement by addressing user input while maintaining compliance with community standards. Together, these components may create a comprehensive solution that balances moderation, education, and engagement, ensuring a safer and more inclusive online environment.

A method for moderating comments with adaptive trust and bias detection is described. The method may include receiving a user comment associated with a user profile. The method may include analyzing the comment for sentiment and bias against predefined bias categories. The method may include, in response to detecting no bias in the comment, posting the comment to a platform and updating a trust score associated with the user profile based on predefined trust score rules. The method may include, in response to detecting bias in the comment, flagging the comment, generating a bias-free version of the comment, and updating the trust score associated with the user profile based on predefined trust score reduction rules. The method may include adjusting user privileges associated with the user profile based on the updated trust score.

A system configured for moderating comments with adaptive trust and bias detection is described. The system may include a processor, memory coupled with the processor, and instructions stored in the memory and executable by the processor. The system may be configured to receive a user comment associated with a user profile. The system may analyze the comment for sentiment and bias against predefined bias categories. The system may post the comment to a platform and update a trust score associated with the user profile based on predefined trust score rules in response to detecting no bias in the comment. The system may flag the comment, generate a bias-free version of the comment, and update the trust score associated with the user profile based on predefined trust score reduction rules in response to detecting bias in the comment. The system may adjust user privileges associated with the user profile based on the updated trust score.

Another system for moderating comments with adaptive trust and bias detection is described. The system may include means for receiving a user comment associated with a user profile. The system may include means for analyzing the comment for sentiment and bias against predefined bias categories. The system may include means for, in response to detecting no bias in the comment, posting the comment to a platform and updating a trust score associated with the user profile based on predefined trust score rules. The system may include means for, in response to detecting bias in the comment, flagging the comment, generating a bias-free version of the comment, and updating the trust score associated with the user profile based on predefined trust score reduction rules. The system may include means for adjusting user privileges associated with the user profile based on the updated trust score.

A non-transitory computer-readable medium storing code for moderating comments with adaptive trust and bias detection is described. The code may include instructions executable by a processor to receive a user comment associated with a user profile. The code may include instructions executable by a processor to analyze the comment for sentiment and bias against predefined bias categories. The code may include instructions executable by a processor to, in response to detecting no bias in the comment, post the comment to a platform and update a trust score associated with the user profile based on predefined trust score rules. The code may include instructions executable by a processor to, in response to detecting bias in the comment, flag the comment, generate a bias-free version of the comment, and update the trust score associated with the user profile based on predefined trust score reduction rules. The code may include instructions executable by a processor to adjust user privileges associated with the user profile based on the updated trust score.

Some examples of the method, systems, and non-transitory computer-readable medium described herein may further include operations, features, means, or instructions for generating a notification to the user profile in response to detecting bias in the comment. The notification may include a description of the detected bias category and options for accepting a bias-free version of the comment or canceling the comment entirely.

Some examples of the method, systems, and non-transitory computer-readable medium described herein may further include operations, features, means, or instructions for analyzing the user comment for sentiment polarity and associating the sentiment polarity with the user profile to refine future trust score updates based on predefined sentiment thresholds.

Some examples of the method, systems, and non-transitory computer-readable medium described herein may further include operations, features, means, or instructions for displaying a visual indicator of the trust score associated with the user profile alongside the posted comment. The visual indicator may be dynamically updated based on changes to the trust score.

Some examples of the method, systems, and non-transitory computer-readable medium described herein may further include operations, features, means, or instructions for providing access to an educational module to the user profile in response to detecting bias in the comment. The educational module may be tailored to the detected bias category and may include interactive content for improving future comment submissions.

Some examples of the method, systems, and non-transitory computer-readable medium described herein may further include operations, features, means, or instructions for automatically generating a conversational response to the posted comment. The response may be unbiased and contextually relevant to the sentiment and subject matter of the comment.

In some examples of the method, systems, and non-transitory computer-readable medium described herein, the predefined bias categories may include hate speech, racism, religious intolerance, sexism, political extremism, and toxic language. The bias-free version of the comment may be generated by removing or rephrasing content associated with the detected bias categories.

In some examples of the method, systems, and non-transitory computer-readable medium described herein, the trust score associated with the user profile may be updated by adding points in response to receiving upvotes on posted comments and subtracting points in response to receiving downvotes on posted comments.

In some examples of the method, systems, and non-transitory computer-readable medium described herein, the user privileges associated with the user profile may include a limit on the number of comments that can be posted daily. The limit may be dynamically adjusted based on the updated trust score.

Some examples of the method, systems, and non-transitory computer-readable medium described herein may further include operations, features, means, or instructions for generating a notification in response to detecting bias in the comment. The notification may include a hyperlink to an educational module tailored to the detected bias category.

In some examples of the method, systems, and non-transitory computer-readable medium described herein, the sentiment analysis of the user comment may include detecting positive, neutral, or negative sentiment and associating the detected sentiment with the user profile for future trust score adjustments.

In some examples of the method, systems, and non-transitory computer-readable medium described herein, the bias-free version of the comment may be generated by applying a natural language processing model trained to identify and rephrase biased language while preserving the original intent of the comment.

In some examples of the method, systems, and non-transitory computer-readable medium described herein, the visual indicator of the trust score may include a color-coded status displayed alongside the user profile. The color-coded status may be green for high trust, yellow for moderate trust, and red for low trust.

Some examples of the method, systems, and non-transitory computer-readable medium described herein may further include operations, features, means, or instructions for receiving an audio input comprising a spoken user comment, transcribing the audio input to text, and analyzing the transcribed comment for sentiment and bias against predefined bias categories.

Some examples of the method, systems, and non-transitory computer-readable medium described herein may further include operations, features, means, or instructions for, in response to detecting bias in the transcribed comment, generating an audio alert to notify the user of the detected bias, and providing the user with an option to rephrase the comment or to use a bias-free version of the generated comment.

BRIEF DESCRIPTION OF THE DRAWINGS

FIGS. 7 and 8 show flowcharts illustrating methods that support moderating comments with adaptive trust and bias detection in accordance with various aspects of the present disclosure.

DETAILED DESCRIPTION

Figure 1:
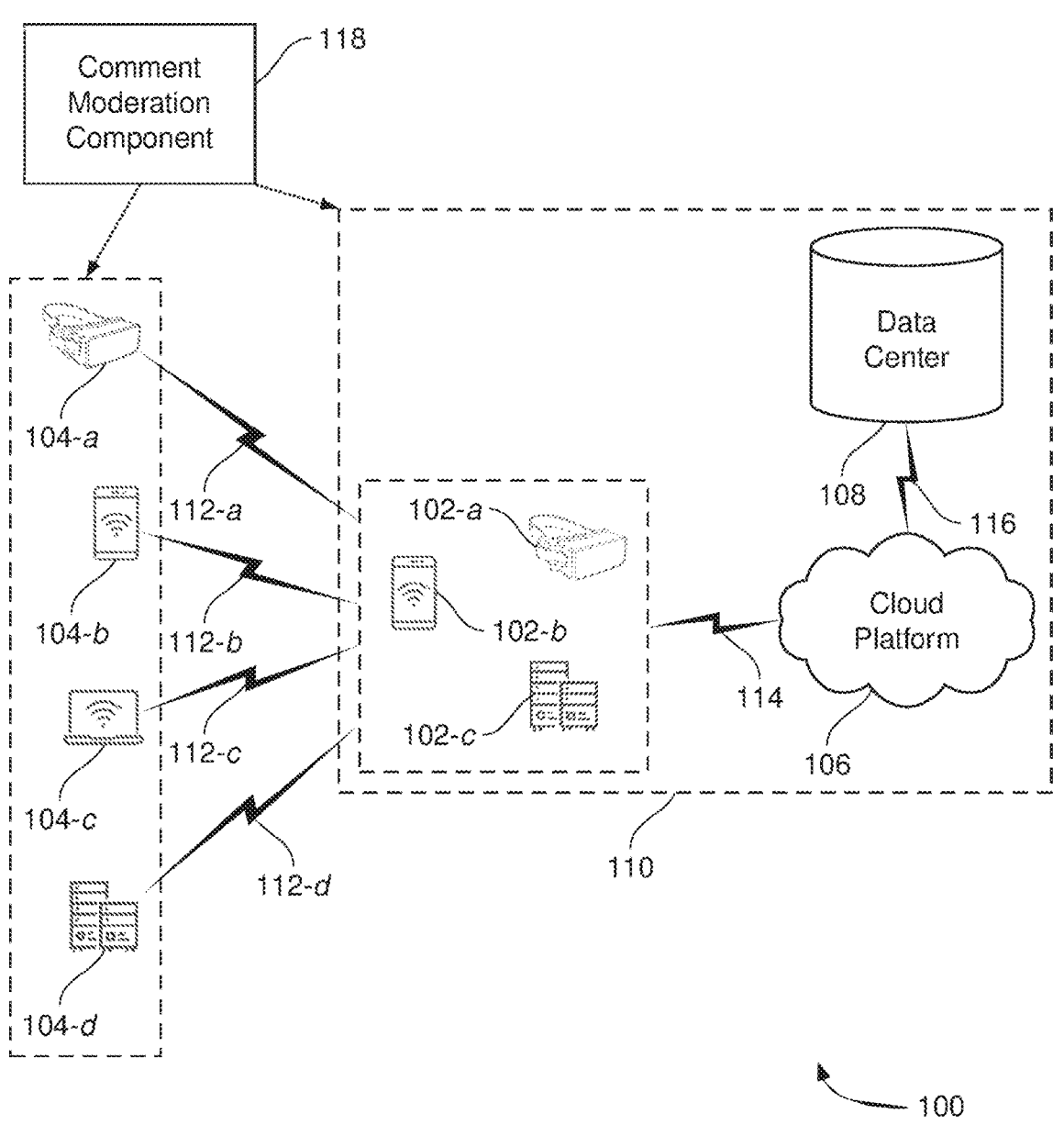
FIG. 1 illustrates an example of a system for data processing that supports moderating comments with adaptive trust and bias detection in accordance with aspects of the present disclosure.
Figure 2A:
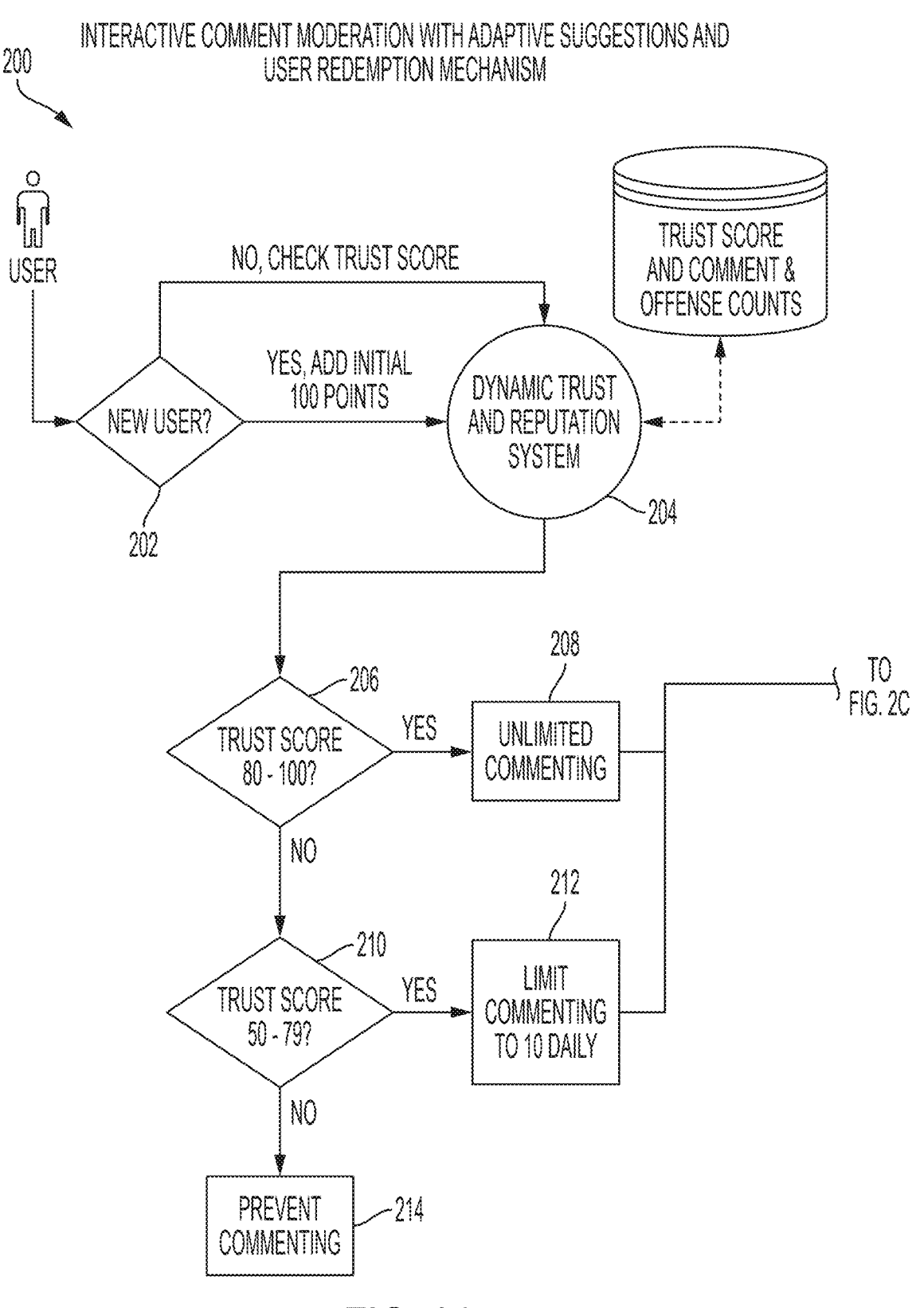
FIGS. 2A, 2B, 2C, 2D, and 2E show a flowchart illustrating a method that supports techniques for moderating comments with adaptive trust and bias detection in accordance with various aspects of the present disclosure.
Figure 2B:
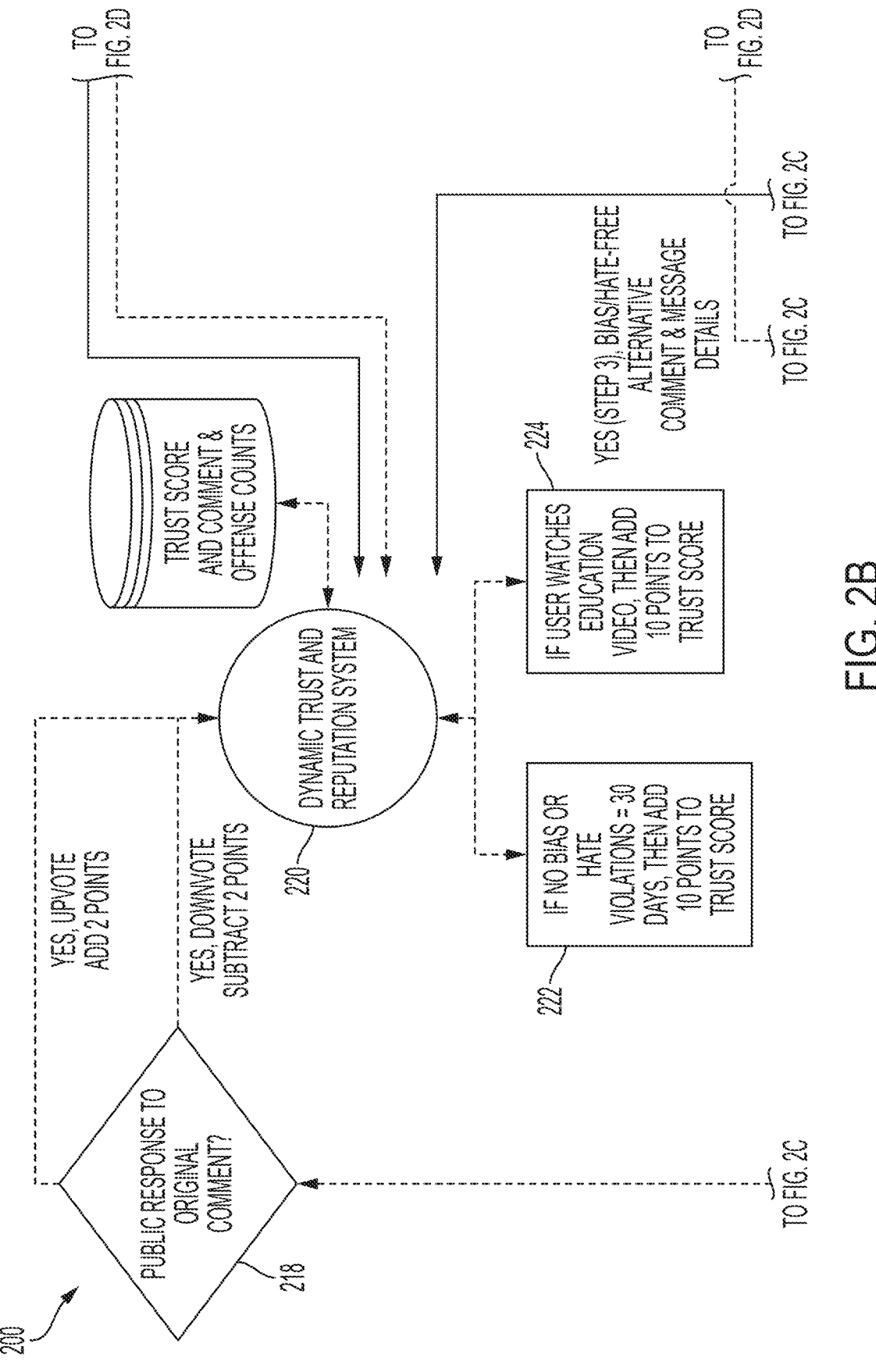
Figure 2C:
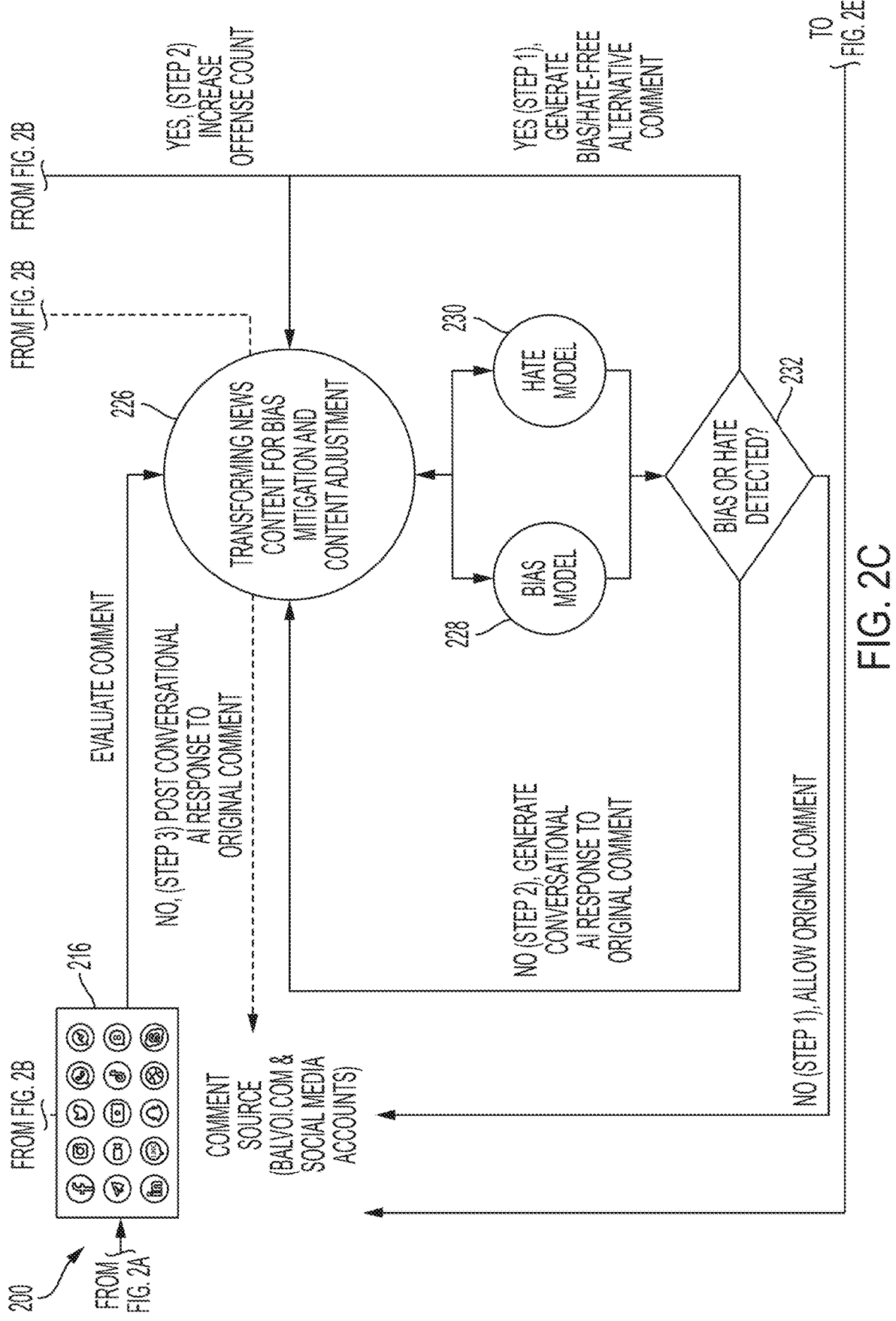
Figure 2D:
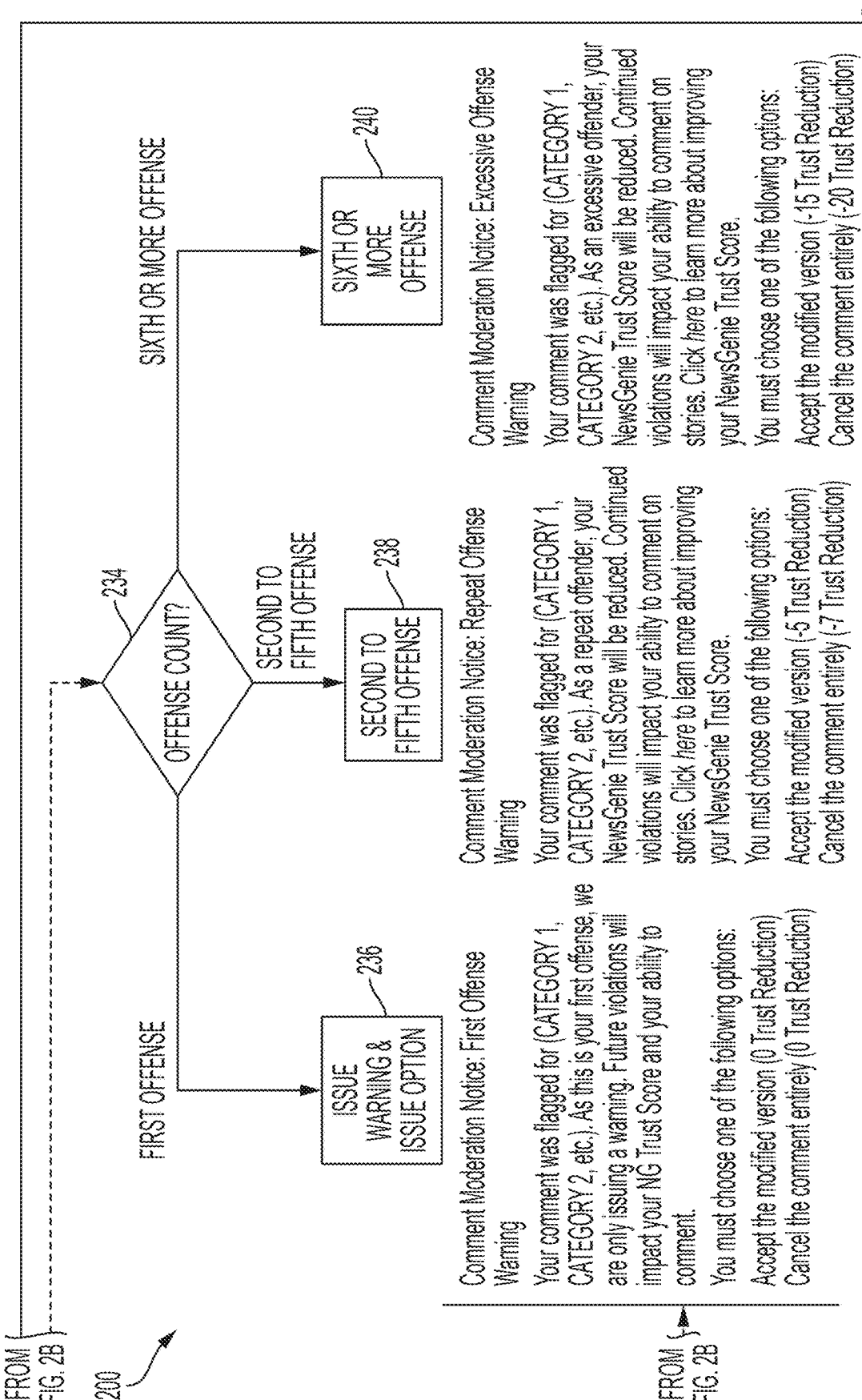
Figures 2C, 2D, 2E:
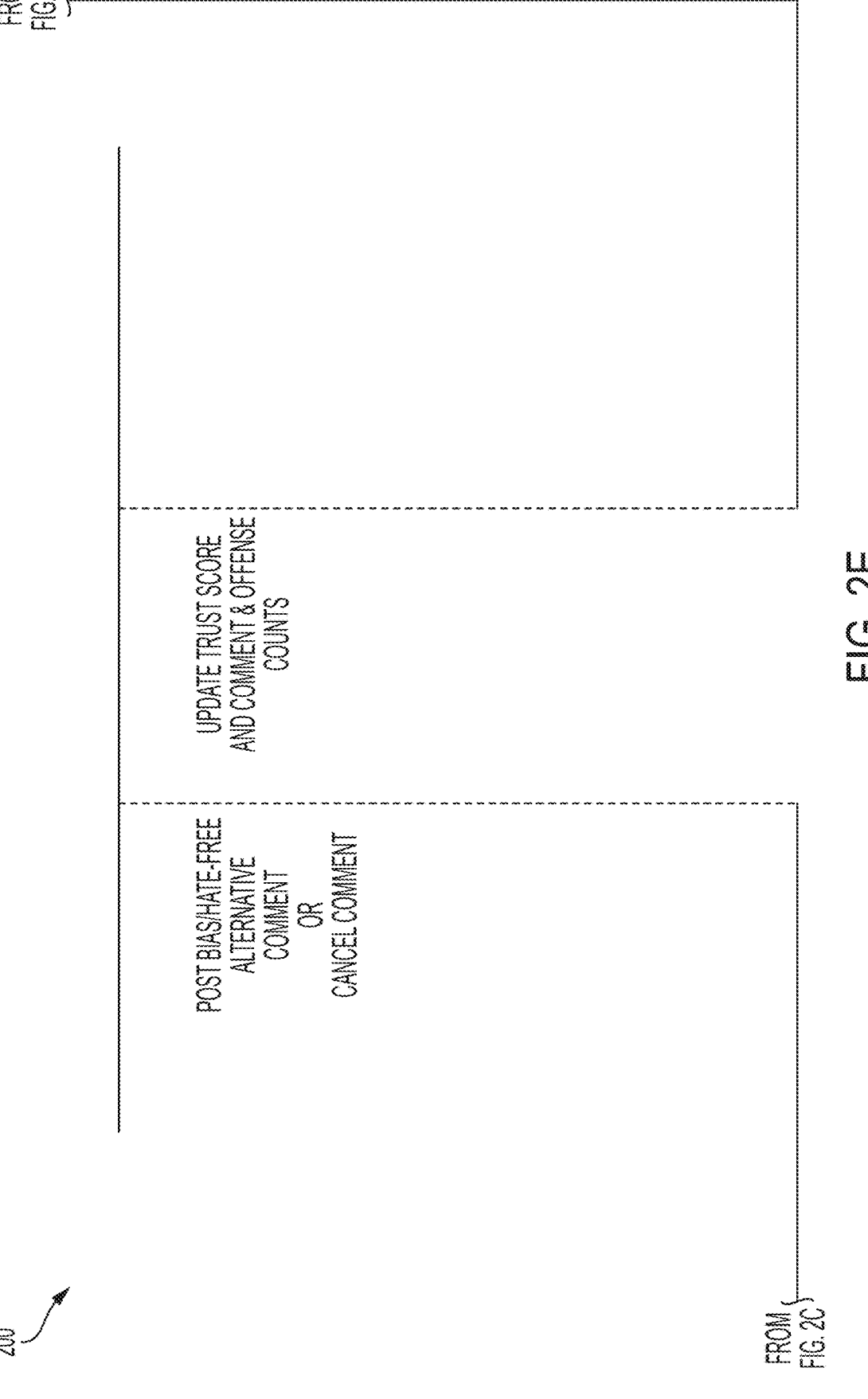

Methods, systems, devices, and apparatuses that support techniques for moderating comments with adaptive trust and bias detection are disclosed. In some examples, current comment moderation systems may be inadequate for addressing the complexity of harmful online behavior. These systems may often rely on static rules or simplistic algorithms that fail to account for the subtleties of sentiment, implicit bias, or evolving community standards. Additionally, they may lack mechanisms to incentivize positive user behavior or rehabilitate users who violate guidelines. This may result in either overly restrictive moderation, which may stifle engagement, or insufficient enforcement, which may allow harmful content to persist. The absence of adaptive trust and reputation systems may further exacerbate the problem, as users may not be held accountable for their actions in a meaningful way. Platforms may need a solution that not only detects and mitigates harmful content but also fosters constructive participation and educates users on community standards.

According to some implementations, an interactive system may dynamically moderate user comments by analyzing their sentiment and detecting potential biases. Comments may be assessed against predefined categories, which may include hate speech, racism and xenophobia, religious intolerance, sexism and misogyny, political extremism, and toxic language or harassment. If a comment does not violate any of these categories, it may be posted directly to the platform. If violations are detected, the comment may be flagged, and a modified version of the comment that complies with community standards may be generated and presented to the user for review.

Some implementations may include a trust and reputation mechanism that may assign users a trust score, which may determine their commenting privileges. Users with a high trust score, which may range from 80 to 100, may be allowed unlimited daily comments and may have full moderation privileges. Users with a moderate trust score, which may range from 50 to 79, may be limited to 10 daily comments. Users with a low trust score, which may range from 0 to 49, may not be allowed to post comments. Trust scores may be adjusted based on user behavior. Positive actions, such as receiving upvotes on comments, may increase the trust score by two points per upvote. Successfully posting unflagged comments for 30 consecutive days may increase the trust score by ten points. Completing optional educational modules and quizzes may increase the trust score by ten points. Negative actions, such as receiving downvotes on comments, may decrease the trust score by two points per downvote. Repeated violations of community standards may result in further trust score reductions.

Some implementations may include a violation response system that may handle flagged comments based on the number of offenses. For a first offense, the user may receive a warning that specifies the bias categories their comment violated. The user may be given the option to accept the modified, bias-free version of their comment or cancel the comment entirely, with no reduction in their trust score. For second through fifth offenses, the user may receive a warning and may be informed of the bias categories their comment violated. The user may be given the option to accept the modified version of their comment, which may result in a reduction of five trust points, or cancel the comment entirely, which may result in a reduction of seven trust points. For sixth or more offenses, the user may receive a warning and may be informed of the bias categories their comment violated. The user may be given the option to accept the modified version of their comment, which may result in a reduction of fifteen trust points, or cancel the comment entirely, which may result in a reduction of twenty trust points.

Some implementations may include educational modules designed to inform users about the impact of their behavior and provide guidance for improving their trust score. These modules may cover topics such as racism and xenophobia, explaining how targeted language may divide communities and spread misinformation; bias and algorithms, demonstrating how negative behavior may distort content feeds and amplify harmful narratives; political extremism, helping users recognize when political discourse may become harmful or incite radicalism; sexism and misogyny, highlighting the harm caused by gender-based insults and assumptions; intent versus impact, educating users on the social and emotional consequences of their words; religious intolerance, providing strategies for expressing disagreement without vilifying religious groups; trust score mechanics, explaining how trust scores may be calculated and why maintaining a high score may be beneficial; constructive communication, offering tips for reframing strong opinions to comply with community standards; harassment and dismissive language, discussing the harm caused by sarcasm, mockery, and personal attacks; and hate speech, explaining the dangers of threats, slurs, and profanity, even when used in a joking context.

Some implementations may include an automated responder system that may enhance user engagement by providing responses to comments that pass the moderation system. This system may read user comments, analyze their context and sentiment, and ensure they are relevant to the associated story. It may generate and post unbiased conversational responses that address the comments and, when appropriate, may include probing or follow-up questions to encourage further discussion.

Some implementations may display user profile information alongside each comment. This information may include the user's profile name, their trust status represented by a color-coded indicator, and the month and year they joined the platform. The trust status indicator may use green to represent high trust, yellow to represent moderate trust, and red to represent low trust.

Aspects of the subject matter described in this disclosure can be implemented to realize one or more of the following potential advantages. The described techniques may be implemented to support enhanced community engagement by fostering a respectful and inclusive environment. By dynamically moderating comments and providing educational resources, users may become more aware of the impact of their language, which may lead to more constructive discussions. The trust and reputation system may incentivize positive behavior, encouraging users to maintain high trust scores and actively participate in the community. Automated responses may facilitate ongoing dialogue, ensuring that user interactions remain relevant and engaging. The adaptive moderation suggestions may help users understand community standards, potentially reducing the frequency of violations and promoting a healthier online atmosphere. Integration across multiple platforms may extend these benefits to a broader audience, potentially improving user experiences across various digital environments.

Aspects of the disclosure are initially described in the context of networked computing systems. Aspects of the disclosure are additionally illustrated by and described with reference to example implementations. Aspects of the disclosure are further illustrated by and described with reference to apparatus diagrams, system diagrams, and flowcharts that relate to moderating comments with adaptive trust and bias detection.

FIG. 1 illustrates an example of a system 100 that supports moderating comments with adaptive trust and bias detection in accordance with various aspects of the present disclosure. The system 100 includes cloud clients 102, user devices 104, a cloud platform 106, and a data center 108. Cloud platform 106 may be an example of a public or private cloud network. A cloud client 102 may access cloud platform 106 over a network connection 114. The network connection 114 may include a wired connection, a wireless connection, or both. The network may implement transfer control protocol and internet protocol (TCP/IP), such as the Internet, or may implement other network protocols. A cloud client 102 may be an example of a computing device, such as a wearable device (e.g., cloud client 102-*a*), a smartphone (e.g., cloud client 102-*b*), or a server (e.g., cloud client 102-*c*). In other examples, a cloud client 102 may be a desktop or laptop computer, a tablet, a sensor, or another computing device or system capable of generating, analyzing, transmitting, or receiving communications. In some examples, a cloud client 102 may be part of a business, an enterprise, a non-profit, a startup, or any other organization type.

A cloud client 102 may facilitate communication between the data center 108 and one or multiple user devices 104 to implement an online environment. The network connection 112 may include communications, opportunities, purchases, sales, or any other interaction between a cloud client 102 and a user device 104. The network connection 112 may include a wired connection, a wireless connection, or both. A cloud client 102 may access cloud platform 106 to store, manage, and process the data communicated via one or more network connections 112. In some cases, the cloud client 102 may have an associated security or permission level. A cloud client 102 may have access to certain applications, data, and database information within cloud platform 106 based on the associated security or permission level, and may not have access to others.

The user device 104 may include a comment moderation component 118. The user device 104 may interact with the cloud client 102 over network connection 112. The network may implement transfer control protocol and internet protocol (TCP/IP), such as the Internet, or may implement other network protocols. The network connection 112 may facilitate transport of data via email, web, text messages, mail, or any other appropriate form of electronic interaction (e.g., network connections 112-*a*, 112-*b*, 112-*c*, and 112-*d*) via a computer network. In an example, the user device 104 may be computing device such as a wearable device 104-*a*, a smartphone 104-*b*, a laptop 104-*c* or a server 104-*d*. In other cases, the user device 104 may be another computing system. In some cases, the user device 104 may be operated by a user or group of users. The user or group of users may be a customer, associated with a business, a manufacturer, or any other appropriate organization.

Cloud platform 106 may offer an on-demand database service to the cloud client 102. In some cases, cloud platform 106 may be an example of a multi-tenant database system. In this case, cloud platform 106 may serve multiple cloud clients 102 with a single instance of software. However, other types of systems may be implemented, including—but not limited to—client-server systems, mobile device systems, and mobile network systems. In some cases, cloud platform 106 may support an online application. This may include support for sales between buyers and sellers operating user devices 104, service, marketing of products posted by buyers, community interactions between buyers and sellers, analytics, such as user-interaction metrics, applications (e.g., computer vision and machine learning), and the Internet of Things (IoT). Cloud platform 106 may receive data associated with generation of an online environment from the cloud client 102 over network connection 114, and may store and analyze the data. In some cases, cloud platform 106 may receive data directly from a user device 104 and the cloud client 102. In some cases, the cloud client 102 may develop applications to run on cloud platform 106. Cloud platform 106 may be implemented using remote servers. In some cases, the remote servers may be located at one or more data centers 108.

Data center 108 may include multiple servers. The multiple servers may be used for data storage, management, and processing. Data center 108 may receive data from cloud platform 106 via connection 116, or directly from the cloud client 102 or via network connection 112 between a user device 104 and the cloud client 102. The connection 116 may include a wired connection, a wireless connection, or both. Data center 108 may utilize multiple redundancies for security purposes. In some cases, the data stored at data center 108 may be backed up by copies of the data at a different data center (not pictured).

Server system 110 may include cloud clients 102, a cloud platform 106, a comment moderation component 118, and a data center 108 that may coordinate with cloud platform 106 and data center 108 to implement an online environment. In some cases, data processing may occur at any of the components of server system 110, or at a combination of these components. Thus, the comment moderation component 118 may be included in the user device 104, server system 110, or in part or in whole in both. In some cases, servers may perform the data processing. The servers may be a cloud client 102 or located at data center 108.

Some or all of the functionality attributed to the comment moderation component 118 may be embodied or performed by one or more user devices 104, one or more components of server system 110 (e.g., cloud clients 102, a cloud platform 106, and/or a data center 108), and/or other components of system 100. The comment moderation component 118 may receive signals and inputs from user device 104 directly. via cloud clients 102, and/or via cloud platform 106 or data center 116.

As described herein, some implementations may utilize the comment moderation component 118 to dynamically assess user comments by employing sentiment analysis and bias detection. Upon receiving a user comment associated with a user profile, the component may analyze the comment against predefined bias categories. If no bias is detected, the comment may be posted to the platform, and the trust score associated with the user profile may be updated according to predefined trust score rules. Conversely, if bias is detected, the comment may be flagged, and a bias-free version may be generated, followed by updating the trust score based on predefined trust score reduction rules. The component may then adjust user privileges associated with the user profile based on the updated trust score, thereby facilitating adaptive trust management within the system 100.

In some implementations, the comment moderation component 118 may support audio-based input and output for real-time moderation of spoken interactions. For example, the comment moderation component 118 may be integrated with telephone systems, online meeting platforms, or collaboration tools that facilitate live audio communication among users. The comment moderation component 118 may receive audio streams or spoken comments, transcribe the audio input using speech-to-text technology, and analyze the resulting text for sentiment and bias using the same predefined bias categories as for text-based comments. This may enable the system 100 to provide consistent moderation across both written and spoken user interactions.

Upon detecting a violation in the transcribed audio, the comment moderation component 118 may generate an immediate audio alert to notify the user of the detected issue. In telephone-based implementations, this alert may be played directly to the user during the call, prompting them to rephrase their comment in real time. In online collaboration environments, the comment moderation component 118 may implement an auto-muting function, temporarily disabling the user's microphone to prevent the transmission of the violating content. The comment moderation component 118 may present the user with an alternative, bias-free version of their comment (e.g., either as on-screen text or as a synthesized audio prompt), which the user can choose to read aloud or restate in their own words.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

FIGS. 2A, 2B, 2C, 2D, and 2E show a flowchart illustrating a method 200 that supports techniques for moderating comments with adaptive trust and bias detection in accordance with various aspects of the present disclosure. Operations illustrated in the method 200 may involve a user device 104, a cloud platform 106, and/or other participants, which may be examples of corresponding devices described herein. The method 200 may describe a process for dynamically evaluating user comments, adjusting trust scores, and providing bias-free alternatives to ensure constructive engagement.

At 202, the cloud platform 106 may determine whether the user is a new user. In some implementations, the cloud platform 106 may check the user's account creation date or the presence of a user profile in its database. If the user is identified as new, the cloud platform 106 may proceed to initialize trust parameters for the user. This determination may be performed automatically upon user login or account registration, ensuring that all users are evaluated for trust status at the outset of their engagement with the cloud platform 106.

At 204, the cloud platform 106 may determine the trust score of the user. In some implementations, the trust score may be retrieved from a user profile database or calculated based on historical activity, such as comment history, upvotes, downvotes, and prior moderation actions. If the user is new, the cloud platform 106 may automatically add 100 additional trust points to the user's trust score as an initial allocation. This baseline trust score may allow new users to participate in commenting activities without immediate restrictions, fostering early engagement.

At 206, the cloud platform 106 may determine if the user's trust score is between 80 and 100. In some implementations, this evaluation may be performed by comparing the user's current trust score to predefined thresholds stored in a configuration of the cloud platform 106. If the trust score falls within this high-trust range, the cloud platform 106 may proceed to grant the user enhanced commenting privileges.

At 208, the cloud platform 106 may provide the user with unlimited commenting capabilities. In some implementations, users in the high-trust tier (trust score 80-100) may be permitted to post an unrestricted number of comments per day. The cloud platform 106 may monitor the user's trust score in real time to ensure continued eligibility for unlimited commenting. Notifications may be sent to users if their trust score changes and affects their commenting privileges.

At 210, the cloud platform 106 may determine if the user's trust score is between 50 and 79. In some implementations, the cloud platform 106 may compare the user's trust score to the mid-tier threshold. If the user's trust score is within this range, the cloud platform 106 may apply a daily commenting limit to encourage positive engagement and provide an opportunity for trust score improvement.

At 212, the cloud platform 106 may allow the user to comment, but limits commenting to 10 comments per day. In some implementations, the cloud platform 106 may track the number of comments posted by the user each day and enforce the daily limit. The comment counter may reset at the start of each new day, and the cloud platform 106 may notify users when they approach or reach their daily limit.

At 214, if the user's trust score is below 50, the cloud platform 106 may prevent the user from commenting. In some implementations, the cloud platform 106 may display a notification to the user explaining the restriction and provide guidance on how to regain commenting privileges, such as participating in educational modules or improving comment quality. The restriction may remain in effect until the user's trust score is restored above the threshold.

At 216, comments may be provided by users via their user device 104, which may occur on the cloud platform 106 itself, on social media, or through other integrated accounts. In some implementations, the cloud platform 106 may aggregate comments from multiple sources and associate them with the user's profile for moderation and trust evaluation. The cloud platform 106 may also display comments publicly, subject to moderation outcomes.

At 218, the cloud platform 106 may determine the public response to the original comment. In some implementations, the cloud platform 106 may monitor user interactions with the comment, such as upvotes (likes/thumbs up) and downvotes (dislikes/thumbs down). For each upvote received, the cloud platform 106 may add two points to the user's trust score, while each downvote may result in a deduction of two points. These adjustments may be performed dynamically to reflect community feedback and maintain an accurate trust and reputation score for each user.

At 220, the cloud platform 106 may maintain a dynamic trust and reputation system. In some implementations, the trust score may be continuously updated based on user activity, community feedback, and moderation outcomes. The cloud platform 106 may display the user's trust status (e.g., Green, Yellow, Red) alongside their profile name and membership date, providing transparency and encouraging positive behavior.

At 222, the cloud platform 106 may evaluate whether the user has posted comments without bias or hate violations for a period of 30 days. If the user maintains a clean record during this period, the cloud platform 106 may automatically add 10 points to the user's trust score as a reward for constructive participation. This incentive may encourage users to adhere to community standards and fosters a positive commenting environment.

At 224, if the user completes an educational module, such as watching an educational video or completing a quiz, the cloud platform 106 may add 10 points to the user's trust score. In some implementations, the cloud platform 106 may offer a variety of educational resources addressing topics such as bias, hate speech, and constructive communication. Successful completion of these modules may be tracked and rewarded to promote user learning and redemption.

At 226, the cloud platform 106 may transform comment content for bias mitigation and content adjustment. In some implementations, submitted comments are analyzed and, if necessary, rephrased to remove bias, hate speech, or other violations. The cloud platform 106 may use natural language processing models to identify problematic language and generate alternative, bias-free versions of the comment while preserving the original intent.

At 228, the cloud platform 106 may run a bias model on the comment. In some implementations, the cloud platform 106 may select and apply an appropriate bias detection model based on the comment's language, context, and content. The selected model may then be used to analyze the comment for potential violations.

At 230, the cloud platform 106 may run a hate model on the comment. In some implementations, the model evaluates the comment for categories such as hate speech, racism, xenophobia, religious intolerance, sexism, political extremism, and toxic language. The outcome of this analysis may determine whether the comment is compliant with community standards.

At 232, the cloud platform 106 determines if bias and/or hate has been detected in the comment. If no bias or hate is detected, the original comment is allowed to be posted. Additionally, if the comment is compliant, the cloud platform 106 may generate a conversational AI response to the comment, engaging the user in further discussion and supporting customer engagement.

If, at 232, bias or hate is detected, the cloud platform 106 generates a bias- and hate-free alternative version of the user's comment. The offense count for the user is incremented to reflect the violation. The cloud platform 106 then proceeds to evaluate the user's offense history to determine the appropriate moderation response.

At 234, the cloud platform 106 determines the offense count for the user. At 236, if the violation is the user's first offense, the cloud platform 106 issues a warning and presents the user with options: accept the modified, bias-free version of their comment for posting (with no trust reduction), or cancel the comment entirely (also with no trust reduction). The warning message may specify the violated categories and inform the user of the consequences of future violations.

At 238, if the offense count is between the second and fifth offense, the cloud platform 106 issues a repeat offense warning. The user is presented with options to accept the modified, bias-free version of their comment (with a 5-point trust reduction) or cancel the comment entirely (with a 7-point trust reduction). The warning may include educational resources and guidance on improving the user's trust score.

At 240, if the offense count is the sixth or greater, the cloud platform 106 issues an excessive offense warning. The user is given the option to accept the modified, bias-free version of their comment (with a 15-point trust reduction) or cancel the comment entirely (with a 20-point trust reduction). The warning emphasizes the severity of repeated violations and the impact on the user's ability to comment in the future.

Figure 3:
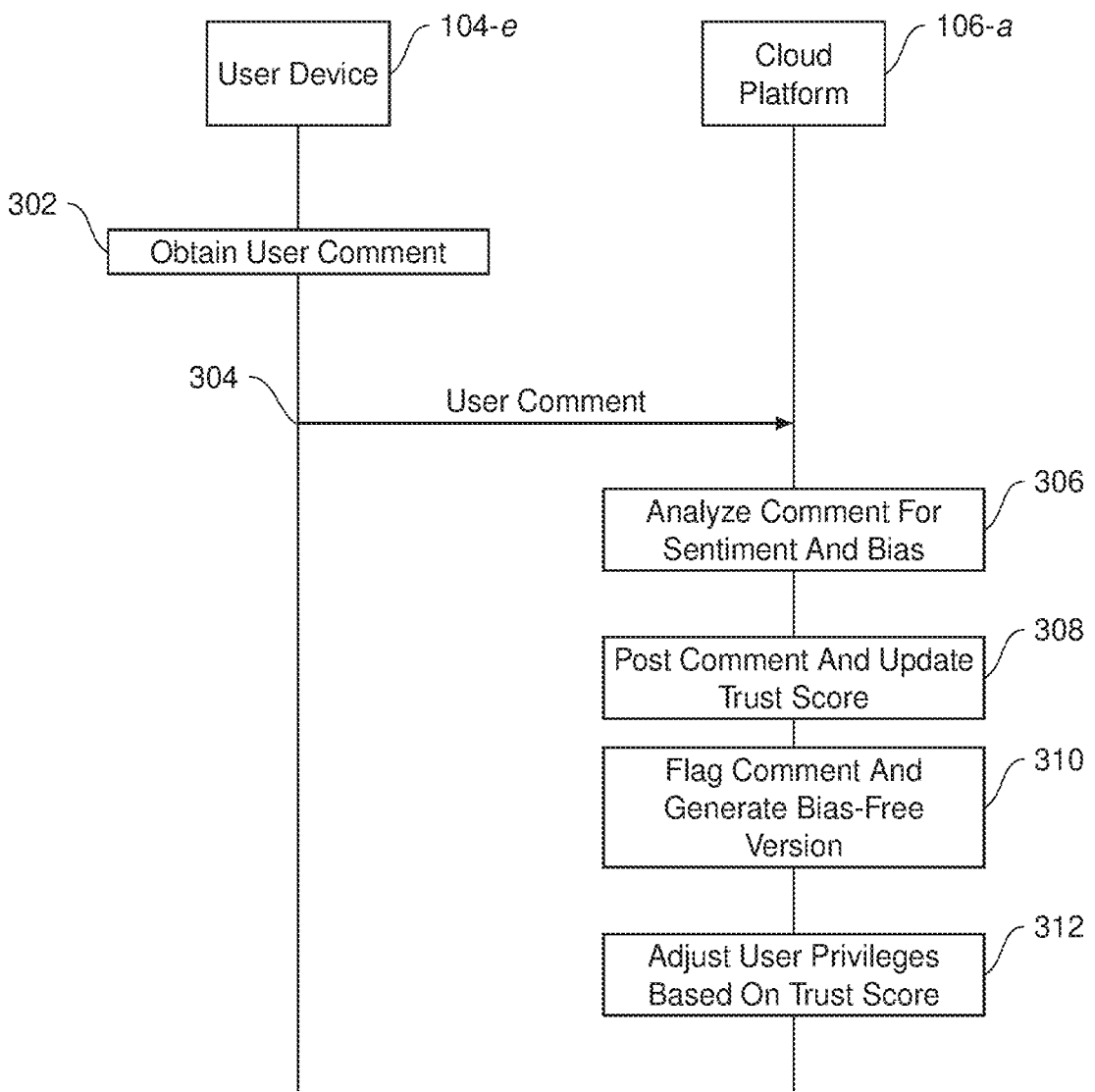
FIG. 3 illustrates an example of a process flow that supports moderating comments with adaptive trust and bias detection in accordance with various aspects of the present disclosure.

FIG. 3 illustrates an example of a process flow 300 that supports moderating comments with adaptive trust and bias detection in accordance with aspects of the present disclosure. In some examples, the process flow 300 may implement aspects of the system 100. For example, the process flow 300 may include a user device 104-e and a cloud platform 106-a, which may be examples of corresponding devices described herein. In some implementations, a cloud platform 106-a moderates comments by receiving a user comment from a user device 104-e, analyzing the comment for sentiment and bias, posting or flagging the comment based on the analysis, generating a bias-free version if necessary, updating a trust score for the user profile, and adjusting user privileges accordingly.

At 302, the user device 104-e may obtain a user comment associated with a user profile. For example, the user device 104-e may retrieve a comment submitted by a user in response to a news article or discussion thread. In some implementations, the user device 104-e may determine whether the comment includes specific keywords or phrases that align with the context of the associated story. The user device 104-e may also identify metadata linked to the comment, such as the timestamp or the sentiment score, to further associate it with the user profile.

At 304, the user device 104-e may transmit the user comment to the cloud platform 106-a. For example, the user device 104-e may send the comment for sentiment analysis and bias detection against key biases, such as hate speech or political extremism, to the cloud platform 106-a. In some implementations, the cloud platform 106-a may process the comment to identify any violations of community standards before posting it to the site. The cloud platform 106-a may flag comments that contain violations and may create a bias-free version of the user's comment for potential posting.

At 306, the cloud platform 106-a may analyze the comment for sentiment and bias against predefined bias categories. For example, the cloud platform 106-a may evaluate whether the comment contains language associated with hate speech, such as slurs or threats, and may determine the overall sentiment as positive, neutral, or negative. In some implementations, the cloud platform 106-a may assess the comment for political extremism by identifying phrases that may incite radicalism or promote divisive rhetoric. The cloud platform 106-a may also compare the comment against a database of flagged terms to detect potential instances of religious intolerance or toxic language.

At 308, in response to detecting no bias in the comment, the cloud platform 106-a may post the comment to a platform and may update a trust score associated with the user profile based on predefined trust score rules. For example, the cloud platform 106-a may determine that a comment expressing a positive sentiment towards a news article does not contain any flagged terms, allowing it to be posted without modification. In some implementations, the cloud platform 106-a may identify comments that receive multiple upvotes from other users as non-biased, which may contribute to an increase in the user's trust score. The cloud platform 106-a may also consider the historical behavior of the user profile, such as the frequency of unflagged comments, when updating the trust score.

At 310, in response to detecting bias in the comment, the cloud platform 106-a may flag the comment, generate a bias-free version of the comment, and update the trust score associated with the user profile based on predefined trust score reduction rules. For example, the cloud platform 106-a may identify a comment containing political extremism and may replace inflammatory phrases with neutral language while retaining the original intent of the comment. In some implementations, the cloud platform 106-a may notify the user of the flagged comment and may present the user with the option to accept the modified version or cancel the comment entirely. The cloud platform 106-a may determine the trust score reduction based on the severity of the detected bias category, such as applying a larger reduction for hate speech compared to toxic language.

At 312, the cloud platform 106-a may adjust user privileges associated with the user profile based on the updated trust score. For example, the cloud platform 106-a may determine that a user with a high trust score may be granted the ability to post unlimited daily comments, while a user with a lower trust score may be restricted to a limited number of comments per day. In some implementations, the cloud platform 106-a may allow users with a trust score above a certain threshold to moderate comments, contributing to the community's content management. The cloud platform 106-a may also consider the user's historical behavior, such as the frequency of flagged comments, when determining the appropriate level of privileges.

Figure 4:
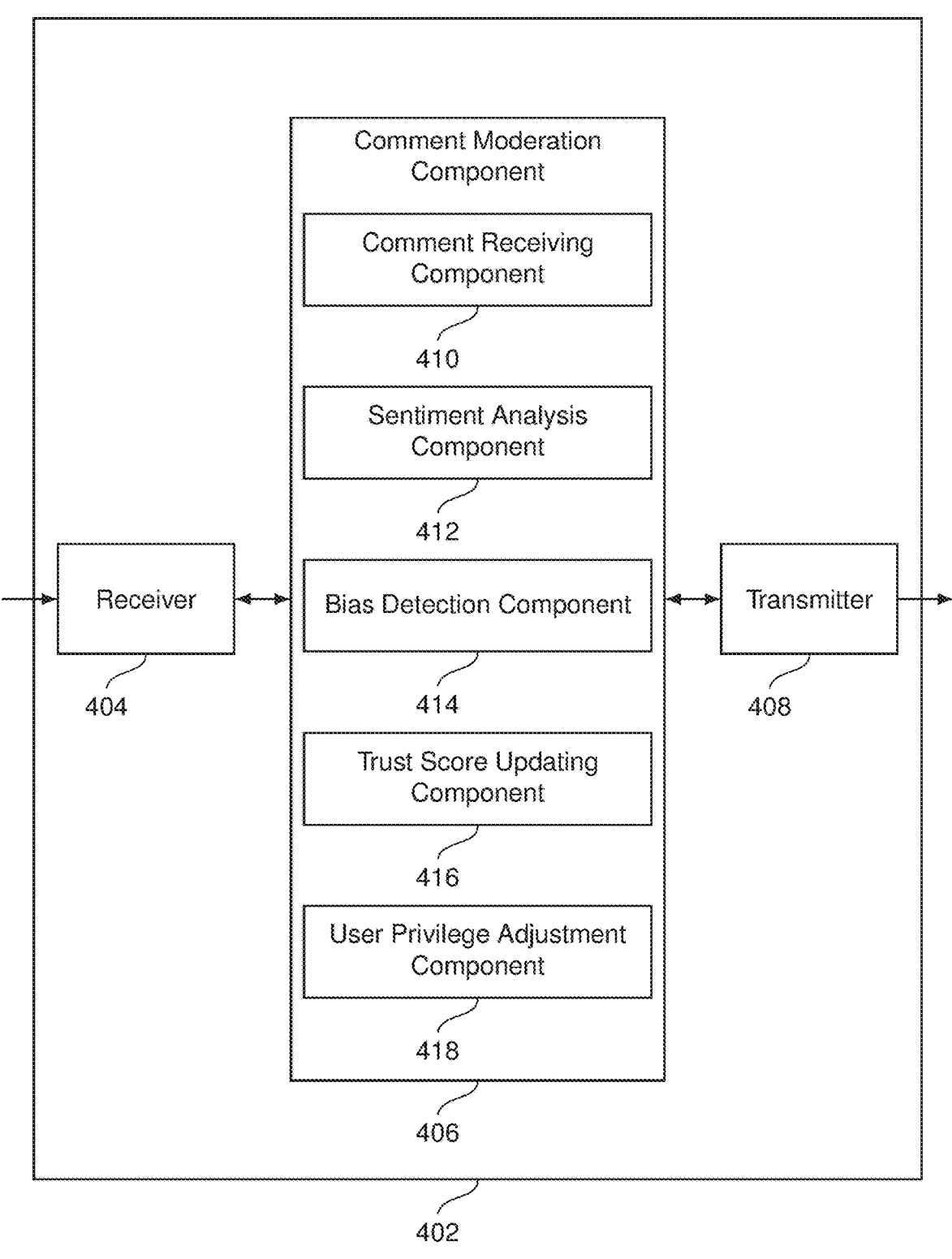
FIG. 4 shows a block diagram of an apparatus that supports moderating comments with adaptive trust and bias detection in accordance with various aspects of the present disclosure.

FIG. 4 shows a block diagram 400 of an apparatus 402 that supports moderating comments with adaptive trust and bias detection in accordance with various aspects of the present disclosure. The apparatus 402 may include an input module 404, comment moderation component 406, and an output module 408. The apparatus 402 may also include a processor. Each of these components may be in communication with one another (e.g., via one or more buses). In some cases, the apparatus 402 may be an example of a user terminal, a database server, or a system containing multiple computing devices.

The input module 404 may manage input signals for the apparatus 402. For example, the input module 404 may identify input signals based on an interaction with a modem, a keyboard, a mouse, a touchscreen, or a similar device. These input signals may be associated with user input or processing at other components or devices. In some cases, the input module 404 may utilize an operating system such as iOS®, ANDROID®, MS-DOS®, MS-WINDOWS®, OS/2®, UNIX®, LINUX®, or another known operating system to handle input signals. The input module 404 may send aspects of these input signals to other components of the apparatus 402 for processing. In some cases, the input module 404 may be a component of an input/output (I/O) controller 606 as described with reference to FIG. 6.

The comment moderation component 406 may include one or more of a comment receiving component 410, a sentiment analysis component 412, a bias detection component 414, a trust score updating component 416, a user privilege adjustment component 418, and/or other components. The comment moderation component 406 may be an example of aspects of the comment moderation component 502 or 604 described with reference to FIGS. 5 and 6.

The comment receiving component 410 may be configured as or otherwise support a means for receiving a user comment associated with a user profile. The sentiment analysis component 412 may be configured as or otherwise support a means for analyzing the comment for sentiment and bias against predefined bias categories. The bias detection component 414 may be configured as or otherwise support a means for detecting bias in the comment. The trust score updating component 416 may be configured as or otherwise support a means for updating a trust score associated with the user profile based on predefined trust score rules when no bias is detected, and based on predefined trust score reduction rules when bias is detected. The user privilege adjustment component 418 may be configured as or otherwise support a means for adjusting user privileges associated with the user profile based on the updated trust score.

The output module 408 may manage output signals for the apparatus 402. For example, the output module 408 may receive signals from other components of the apparatus 402, such as the comment moderation component 406, and may transmit these signals to other components or devices. In some specific examples, the output module 408 may transmit output signals for display in a user interface, for storage in a database or data store, for further processing at a server or server cluster, or for any other processes at any number of devices or systems. In some cases, the output module 408 may be a component of an I/O controller 606 as described with reference to FIG. 6.

Figure 5:
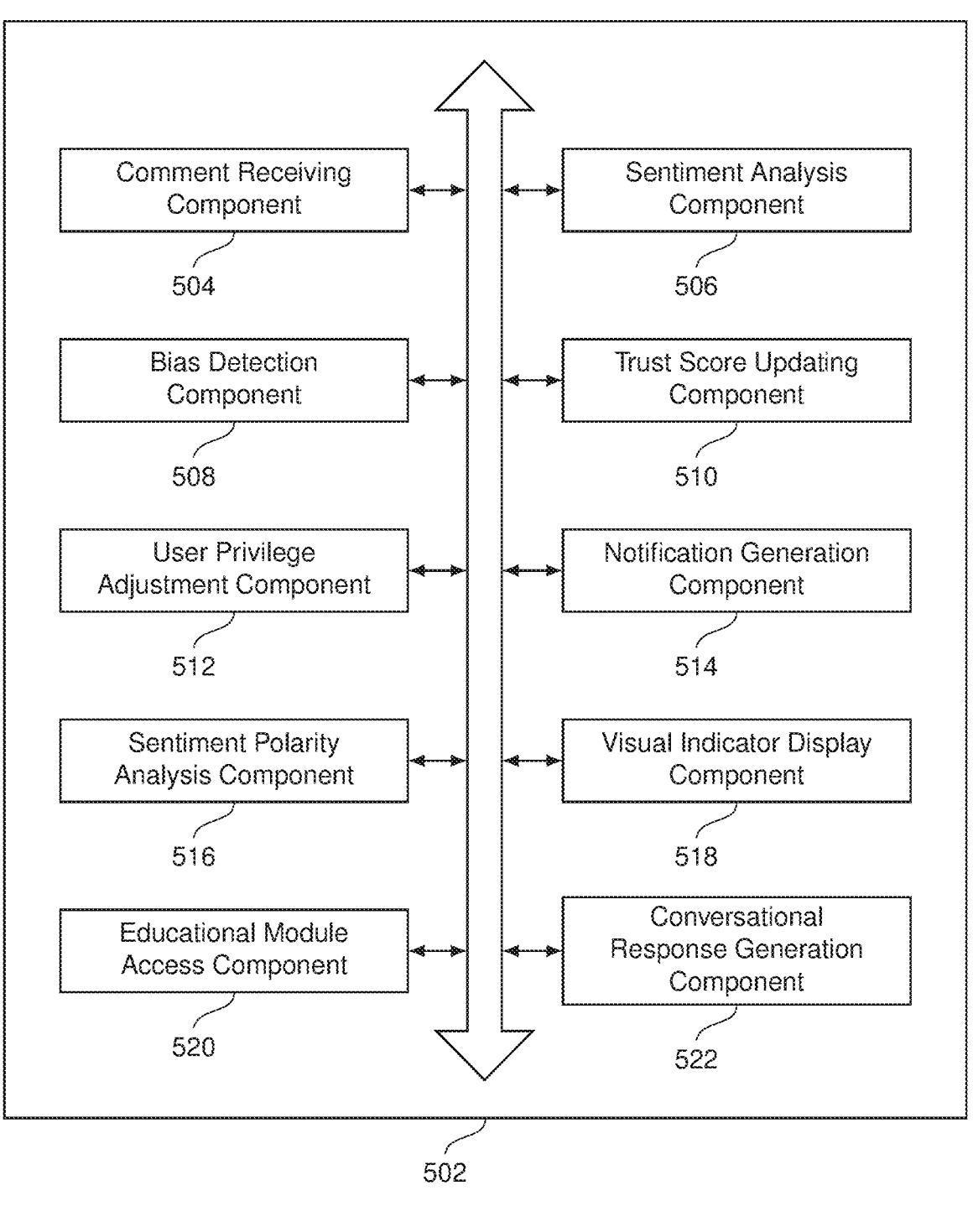
FIG. 5 shows a block diagram of a comment moderation component that supports moderating comments with adaptive trust and bias detection in accordance with various aspects of the present disclosure.

FIG. 5 shows a block diagram 500 of a comment moderation component 502 that supports moderating comments with adaptive trust and bias detection in accordance with various aspects of the present disclosure. The comment moderation component 502 may be an example of aspects of a comment moderation component 406, a comment moderation component 604, or both, as described herein. The comment moderation component 502, or various components thereof, may be an example of means for performing various aspects of moderating comments with adaptive trust and bias detection as described herein. For example, the comment moderation component 502 may include one or more of a comment receiving component 504, a sentiment analysis component 506, a bias detection component 508, a trust score updating component 510, a user privilege adjustment component 512, a notification generation component 514, a sentiment polarity analysis component 516, a visual indicator display component 518, an educational module access component 520, a conversational response generation component 522, and/or other components. Each of these components may communicate, directly or indirectly, with one another (e.g., via one or more buses).

The comment receiving component 504 may be configured as or otherwise support a means for receiving a user comment associated with a user profile. In some implementations, the comment receiving component 504 may determine whether the user comment aligns with sentiment analysis and bias detection categories, such as hate speech, racism, and/or xenophobia. In some implementations, the comment receiving component 504 may identify whether the user comment contains toxic language or harassment before processing it further. In some implementations, the comment receiving component 504 may assess the user profile's trust score to determine the user's commenting permissions, such as the number of daily comments allowed.

The sentiment analysis component 506 may be configured as or otherwise support a means for analyzing the comment for sentiment and bias against predefined bias categories. In some implementations, the sentiment analysis component 506 may determine whether the comment exhibits toxic language or harassment by referencing specific linguistic patterns or flagged keywords. In some implementations, the sentiment analysis component 506 may assess the emotional tone of the comment, such as identifying whether the language used may reflect anger, sarcasm, or hostility. In some implementations, the sentiment analysis component 506 may compare the comment against a database of previously flagged comments to identify recurring patterns that may indicate bias or harmful intent.

The bias detection component 508 may be configured as or otherwise support a means for detecting bias in the comment based on predefined bias categories. In some implementations, the bias detection component 508 may identify bias by referencing a database of linguistic patterns associated with categories such as hate speech, racism, and/or xenophobia. In some implementations, the bias detection component 508 may detect bias by analyzing the frequency of flagged keywords within a comment. In some implementations, the bias detection component 508 may assess whether the comment aligns with sentiment analysis results to determine if it reflects bias in tone or intent.

The trust score updating component 510 may be configured as or otherwise support a means for updating a trust score associated with the user profile based on predefined trust score rules in response to detecting no bias in the comment. In some implementations, the trust score updating component 510 may determine whether the user has consistently posted unflagged comments over a specified period, such as 30 days, to adjust the trust score. In some implementations, the trust score updating component 510 may assess whether the user has completed an optional learning module and quiz to allocate additional trust points. In some implementations, the trust score updating component 510 may evaluate the frequency of upvotes received on the user's comments to determine incremental trust score increases.

The trust score updating component 510 may be configured as or otherwise support a means for updating the trust score associated with the user profile based on predefined trust score reduction rules in response to detecting bias in the comment. In some implementations, the trust score updating component 510 may determine whether the detected bias aligns with specific categories, such as hate speech, racism, and/or xenophobia, to apply the appropriate trust score reduction. In some implementations, the trust score updating component 510 may assess the frequency of flagged comments associated with the user profile to determine the magnitude of the trust score reduction. In some implementations, the trust score updating component 510 may evaluate whether the user has previously accepted modified versions of flagged comments to adjust the trust score reduction accordingly.

The user privilege adjustment component 512 may be configured as or otherwise support a means for adjusting user privileges associated with the user profile based on the updated trust score. In some implementations, the user privilege adjustment component 512 may determine whether the updated trust score qualifies the user for a higher trust tier, such as moving from a low trust score range to a moderate trust score range. In some implementations, the user privilege adjustment component 512 may assess whether the updated trust score necessitates a reduction in commenting permissions, such as limiting the number of daily comments allowed. In some implementations, the user privilege adjustment component 512 may evaluate whether the updated trust score permits the user to regain previously restricted privileges, such as the ability to post comments after a suspension.

In some examples, the notification generation component 514 may be configured as or otherwise support a means for generating a notification to the user profile in response to detecting bias in the comment, the notification including a description of the detected bias category and options for accepting a bias-free version of the comment or canceling the comment entirely. In some implementations, the notification generation component 514 may determine whether the notification should include specific examples of flagged language to help the user understand the bias category. In some implementations, the notification generation component 514 may assess whether the notification should include a link to educational resources tailored to the detected bias category. In some implementations, the notification generation component 514 may evaluate whether the notification should include a summary of the user's recent commenting history to contextualize the detected bias.

In some examples, the sentiment polarity analysis component 516 may be configured as or otherwise support a means for analyzing the user comment for sentiment polarity and associating the sentiment polarity with the user profile to refine future trust score updates based on predefined sentiment thresholds. In some implementations, the sentiment polarity analysis component 516 may determine whether the sentiment polarity of the comment reflects a positive, neutral, or negative tone based on linguistic markers. In some implementations, the sentiment polarity analysis component 516 may assess whether the sentiment polarity aligns with the emotional tone of prior comments associated with the user profile. In some implementations, the sentiment polarity analysis component 516 may evaluate whether the sentiment polarity of the comment falls within a predefined range to identify potential deviations in user behavior.

In some examples, the visual indicator display component 518 may be configured as or otherwise support a means for displaying a visual indicator of the trust score associated with the user profile alongside the posted comment, the visual indicator may be dynamically updated based on changes to the trust score. In some implementations, the visual indicator display component 518 may present the trust score as a color-coded badge next to the user's comment, where green may indicate a high trust score and red may indicate a low trust score. In some implementations, the visual indicator display component 518 may incorporate a numerical representation of the trust score, allowing users to see precise changes in their score over time. In some implementations, the visual indicator display component 518 may include a tooltip feature that may provide additional context about the trust score when users hover over the visual indicator.

In some examples, the educational module access component 520 may be configured as or otherwise support a means for providing access to an educational module to the user profile in response to detecting bias in the comment, the educational module may be tailored to the detected bias category and may include interactive content for improving future comment submissions. In some implementations, the educational module access component 520 may determine whether the interactive content includes scenario-based exercises that simulate real-world commenting situations. In some implementations, the educational module access component 520 may assess whether the module incorporates multimedia elements, such as videos or infographics, to explain the impact of biased language. In some implementations, the educational module access component 520 may evaluate whether the module includes quizzes that may test the user's understanding of the detected bias category. In some implementations, the educational module access component 520 may determine whether the module offers examples of bias-free language alternatives to help users reframe their comments.

In some examples, the conversational response generation component 522 may be configured as or otherwise support a means for automatically generating a conversational response to the posted comment, the response may be unbiased and contextually relevant to the sentiment and subject matter of the comment. In some implementations, the conversational response generation component 522 may determine whether the response incorporates neutral language to avoid reflecting any bias present in the original comment. In some implementations, the conversational response generation component 522 may assess whether the response aligns with the emotional tone of the comment, such as maintaining a positive tone when replying to a positive comment. In some implementations, the conversational response generation component 522 may evaluate whether the response includes a follow-up question to encourage further engagement with the user.

Figure 6:
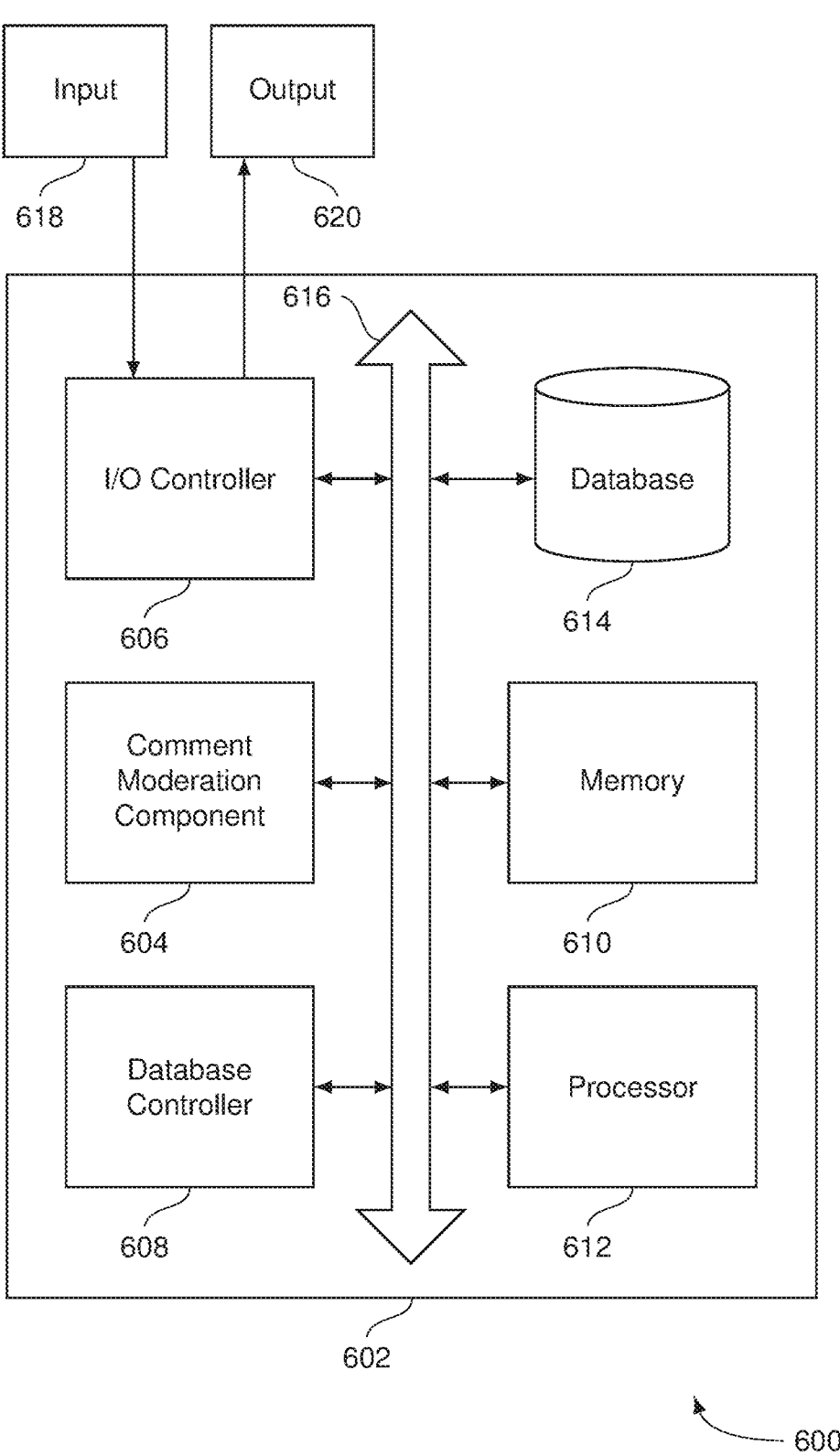
FIG. 6 shows a diagram of a system including a device that supports moderating comments with adaptive trust and bias detection in accordance with various aspects of the present disclosure.

FIG. 6 shows a diagram of a system 600 including a device 602 that supports moderating comments with adaptive trust and bias detection in accordance with aspects of the present disclosure. The device 602 may be an example of or include the components of a database server or an apparatus 402 as described herein. The device 602 may include components for bi-directional data communications including components for transmitting and receiving communications, including a comment moderation component 604, an I/O controller 606, a database controller 608, memory 610, a processor 612, and a database 614. These components may be in electronic communication via one or more buses (e.g., bus 616).

The comment moderation component 604 may be an example of a comment moderation component 406 or 502 as described herein. For example, the comment moderation component 604 may perform any of the methods or processes described above with reference to FIGS. 4 and 5. In some cases, the comment moderation component 604 may be implemented in hardware, software executed by a processor, firmware, or any combination thereof.

The I/O controller 606 may manage input signals 618 and output signals 620 for the device 602. The I/O controller 606 may also manage peripherals not integrated into the device 602. In some cases, the I/O controller 606 may represent a physical connection or port to an external peripheral. In some cases, the I/O controller 606 may utilize an operating system such as iOS®, ANDROID®, MS-DOS®, MS-WINDOWS®, OS/2®, UNIX®, LINUX®, or another known operating system. In other cases, the I/O controller 606 may represent or interact with a modem, a keyboard, a mouse, a touchscreen, or a similar device. In some cases, the I/O controller 606 may be implemented as part of a processor. In some cases, a user may interact with the device 602 via the I/O controller 606 or via hardware components controlled by the I/O controller 606.

The database controller 608 may manage data storage and processing in a database 614. In some cases, a user may interact with the database controller 608. In other cases, the database controller 608 may operate automatically without user interaction. The database 614 may be an example of a single database, a distributed database, multiple distributed databases, a data store, a data lake, or an emergency backup database.

Memory 610 may include random-access memory (RAM) and read-only memory (ROM). The memory 610 may store computer-readable, computer-executable software including instructions that, when executed, cause the processor to perform various functions described herein. In some cases, the memory 610 may contain, among other things, a basic input/output system (BIOS) which may control basic hardware or software operation such as the interaction with peripheral components or devices.

The processor 612 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 612 may be configured to operate a memory array using a memory controller. In other cases, a memory controller may be integrated into the processor 612. The processor 612 may be configured to execute computer-readable instructions stored in a memory 610 to perform various functions (e.g., functions or tasks supporting moderating comments with adaptive trust and bias detection).

FIG. 7 shows a flowchart illustrating a method 700 that supports moderating comments with adaptive trust and bias detection in accordance with various aspects of the present disclosure. The operations of the method 700 may be implemented by one or more components of a networked computing system as described herein. For example, the operations of the method 700 may be performed by a comment moderation component as described with reference to FIGS. 4 through 6. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 702, the method 700 may include receiving a user comment associated with a user profile. The operations of 702 may be performed in accordance with examples as disclosed herein. In some examples, aspects of the operations of 702 may be performed by a comment receiving component 504 as described with reference to FIG. 5.

At 704, the method 700 may include analyzing the comment for sentiment and bias against predefined bias categories. The operations of 704 may be performed in accordance with examples as disclosed herein. In some examples, aspects of the operations of 704 may be performed by a sentiment analysis component 506 and a bias detection component 508 as described with reference to FIG. 5.

At 706, the method 700 may include, in response to detecting no bias in the comment, posting the comment to a platform and updating a trust score associated with the user profile based on predefined trust score rules. The operations of 706 may be performed in accordance with examples as disclosed herein. In some examples, aspects of the operations of 706 may be performed by a trust score updating component 510 as described with reference to FIG. 5.

At 708, the method 700 may include, in response to detecting bias in the comment, flagging the comment, generating a bias-free version of the comment, and updating the trust score associated with the user profile based on predefined trust score reduction rules. The operations of 708 may be performed in accordance with examples as disclosed herein. In some examples, aspects of the operations of 708 may be performed by a trust score updating component 510 and a notification generation component 514 as described with reference to FIG. 5.

At 710, the method 700 may include adjusting user privileges associated with the user profile based on the updated trust score. The operations of 710 may be performed in accordance with examples as disclosed herein. In some examples, aspects of the operations of 710 may be performed by a user privilege adjustment component 512 as described with reference to FIG. 5.

FIG. 8 shows a flowchart illustrating a method 800 that supports moderating comments with adaptive trust and bias detection in accordance with various aspects of the present disclosure. The operations of the method 800 may be implemented by one or more components of a networked computing system as described herein. For example, the operations of the method 800 may be performed by a comment moderation component as described with reference to FIGS. 4 through 6. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 802, the method 800 may include transmitting, from a user device, a user comment associated with a user profile to a platform for analysis. The operations of 802 may be performed in accordance with examples as disclosed herein. In some examples, aspects of the operations of 802 may be performed by a comment receiving component 504 as described with reference to FIG. 5.

At 804, the method 800 may include receiving, at the user device, a notification indicating whether the comment has been flagged for bias based on predefined bias categories. The operations of 804 may be performed in accordance with examples as disclosed herein. In some examples, aspects of the operations of 804 may be performed by a notification generation component 514 as described with reference to FIG. 5.

At 806, the method 800 may include, in response to receiving a notification that the comment has not been flagged for bias, displaying confirmation of the comment being posted to the platform and an updated trust score associated with the user profile based on predefined trust score rules. The operations of 806 may be performed in accordance with examples as disclosed herein. In some examples, aspects of the operations of 806 may be performed by a trust score updating component 510 as described with reference to FIG. 5.

At 808, the method 800 may include, in response to receiving a notification that the comment has been flagged for bias, displaying the flagged comment, a bias-free version of the comment generated by the platform, and an updated trust score associated with the user profile based on predefined trust score reduction rules. The operations of 808 may be performed in accordance with examples as disclosed herein. In some examples, aspects of the operations of 808 may be performed by a bias detection component 508 as described with reference to FIG. 5.

At 810, the method 800 may include adjusting, at the user device, the display of user privileges associated with the user profile based on the updated trust score. The operations of 810 may be performed in accordance with examples as disclosed herein. In some examples, aspects of the operations of 810 may be performed by a user privilege adjustment component 512 as described with reference to FIG. 5.

It should be noted that the methods described herein describe possible implementations, and that the operations and the steps may be rearranged or otherwise modified and that other implementations are possible. Furthermore, aspects from two or more of the methods may be combined.

Aspect 1: A method for moderating comments with adaptive trust and bias detection, comprising: receiving a user comment associated with a user profile; analyzing the comment for sentiment and bias against predefined bias categories; in response to detecting no bias in the comment, posting the comment to a platform and updating a trust score associated with the user profile based on predefined trust score rules; in response to detecting bias in the comment, flagging the comment, generating a bias-free version of the comment, and updating the trust score associated with the user profile based on predefined trust score reduction rules; and adjusting user privileges associated with the user profile based on the updated trust score.

Aspect 2: The method of aspect 1, further comprising generating a notification to the user profile in response to detecting bias in the comment, the notification including a description of the detected bias category and options for accepting a bias-free version of the comment or canceling the comment entirely.

Aspect 3: The method of any of aspects 1 through 2, further comprising analyzing the user comment for sentiment polarity and associating the sentiment polarity with the user profile to refine future trust score updates based on predefined sentiment thresholds.

Aspect 4: The method of any of aspects 1 through 3, further comprising displaying a visual indicator of the trust score associated with the user profile alongside the posted comment, the visual indicator being dynamically updated based on changes to the trust score.

Aspect 5: The method of any of aspects 1 through 4, further comprising providing access to an educational module to the user profile in response to detecting bias in the comment, the educational module being tailored to the detected bias category and including interactive content for improving future comment submissions.

Aspect 6: The method of any of aspects 1 through 5, further comprising automatically generating a conversational response to the posted comment, the response being unbiased and contextually relevant to the sentiment and subject matter of the comment.

Aspect 7: The method of any of aspects 1 through 6, wherein the predefined bias categories include hate speech, racism, religious intolerance, sexism, political extremism, and toxic language, and the bias-free version of the comment is generated by removing or rephrasing content associated with the detected bias categories.

Aspect 8: The method of any of aspects 1 through 7, wherein the trust score associated with the user profile is updated by adding points in response to receiving upvotes on posted comments and subtracting points in response to receiving downvotes on posted comments.

Aspect 9: The method of any of aspects 1 through 8, wherein the user privileges associated with the user profile include a limit on the number of comments that can be posted daily, the limit being dynamically adjusted based on the updated trust score.

Aspect 10: The method of any of aspects 1 through 9, wherein the notification generated in response to detecting bias in the comment includes a hyperlink to an educational module tailored to the detected bias category.

Aspect 11: The method of any of aspects 1 through 10, wherein the sentiment analysis of the user comment includes detecting positive, neutral, or negative sentiment and associating the detected sentiment with the user profile for future trust score adjustments.

Aspect 12: The method of any of aspects 1 through 11, wherein the bias-free version of the comment is generated by applying a natural language processing model trained to identify and rephrase biased language while preserving the original intent of the comment.

Aspect 13: The method of any of aspects 1 through 12, wherein the visual indicator of the trust score includes a color-coded status displayed alongside the user profile, the color-coded status being green for high trust, yellow for moderate trust, and red for low trust.

Aspect 14: The method of any of aspects 1 through 13, further comprising receiving an audio input comprising a spoken user comment, transcribing the audio input to text, and analyzing the transcribed comment for sentiment and bias against predefined bias categories.

Aspect 15: The method of any of aspects 1 through 14, further comprising, in response to detecting bias in the transcribed comment, generating an audio alert to notify the user of the detected bias, and providing the user with an option to rephrase the comment or to use a bias-free version of the generated comment.

Aspect 16: A system for moderating comments with adaptive trust and bias detection, comprising a processor; memory coupled with the processor; and instructions stored in the memory and executable by the processor to cause the system to perform a method of any of aspects 1 through 15.

Aspect 17: A system for moderating comments with adaptive trust and bias detection, comprising at least one means for performing a method of any of aspects 1 through 15.

Aspect 18: A non-transitory computer-readable medium storing code for moderating comments with adaptive trust and bias detection, the code comprising instructions executable by a processor to perform a method of any of aspects 1 through 15.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for moderating comments with adaptive trust and bias detection, comprising:
  receiving a comment associated with a user profile of a user;
  analyzing the comment for sentiment and bias against predefined bias categories;

23

24 in response to detecting no bias in the comment, posting the comment to a platform and updating a trust score associated with the user profile based on predefined trust score rules;

in response to detecting bias in the comment, flagging the comment, generating a bias-free version of the comment for acceptance and replacement with the comment, and updating the trust score associated with the user profile based on predefined trust score reduction rules;

adjusting user privileges associated with the user profile based on an updated trust score; and generating a notification to the user profile in response to detecting the bias in the comment, the notification including a description of a detected bias category, a first option for completing the acceptance of the bias-free version of the comment and the replacement of the comment, and a second option for canceling the comment entirely.

2. The method of claim 1, further comprising analyzing the comment for sentiment polarity and associating the sentiment polarity with the user profile to refine future trust score updates based on predefined sentiment thresholds.

3. The method of claim 1, further comprising displaying a visual indicator of the trust score associated with the user profile alongside the comment, the visual indicator being dynamically updated based on changes to the trust score.

4. The method of claim 3, wherein the visual indicator of the trust score includes a color-coded status displayed alongside the user profile, the color-coded status being green for high trust, yellow for moderate trust, and red for low trust.

5. The method of claim 1, further comprising providing access to an educational module to the user profile in response to detecting the bias in the comment, the educational module being tailored to the detected bias category and including interactive content for improving future comment submissions.

6. The method of claim 1, further comprising automatically generating a conversational response to the comment or the bias-free version, the response being unbiased and contextually relevant to the sentiment and subject matter of the comment.

7. The method of claim 1, wherein the predefined bias categories include hate speech, racism, religious intolerance, sexism, political extremism, and toxic language, and the bias-free version of the comment is generated by removing or rephrasing content associated with the detected bias category.

8. The method of claim 1, wherein the trust score associated with the user profile is updated by adding points in response to receiving upvotes on posted comments and subtracting points in response to receiving downvotes on posted comments.

9. The method of claim 1, wherein the user privileges associated with the user profile include a limit on a quantity of comments that can be posted daily, the limit being dynamically adjusted based on the updated trust score.

10. The method of claim 1, wherein the notification generated in response to detecting the bias in the comment includes a hyperlink to an educational module tailored to the detected bias category.

11. The method of claim 1, wherein sentiment analysis of the comment includes detecting positive, neutral, or negative sentiment and associating detected sentiment with the user profile for future trust score adjustments.

12. The method of claim 1, wherein the bias-free version of the comment is generated by applying a natural language processing model trained to identify and rephrase biased language while preserving original intent of the comment.

13. The method of claim 1, further comprising receiving an audio input comprising a spoken user comment, transcribing the audio input to text to generate a transcribed comment, and analyzing the transcribed comment for sentiment and bias against the predefined bias categories.

14. The method of claim 13, further comprising, in response to detecting bias in the transcribed comment, generating an audio alert to notify the user of detected bias, and providing the user with an option to rephrase the transcribed comment or to use a bias-free version of the transcribed comment.

15. The method of claim 1, wherein selection of the first option causes the bias-free version of the comment to be posted.

16. A system configured for moderating comments with adaptive trust and bias detection, comprising:

a processor;

memory coupled with the processor; and instructions stored in the memory and executable by the processor to cause the system to:

receive a comment associated with a user profile of a user;

analyze the comment for sentiment and bias against predefined bias categories;

post the comment to a platform and update a trust score associated with the user profile based on predefined trust score rules in response to detecting no bias in the comment;

flag the comment, generate a bias-free version of the comment for acceptance and replacement with the comment, and update the trust score associated with the user profile based on predefined trust score reduction rules in response to detecting bias in the comment;

adjust user privileges associated with the user profile based on an updated trust score; and generate a notification to the user profile in response to detecting the bias in the comment, the notification including a description of a detected bias category, a first option for completing the acceptance of the bias-free version of the comment and the replacement of the comment, and a second option for canceling the comment entirely.

17. The system of claim 16, wherein the instructions are further executable by the processor to cause the system to: analyze the comment for sentiment polarity and associate the sentiment polarity with the user profile to refine future trust score updates based on predefined sentiment thresholds.

18. The system of claim 16, wherein the instructions are further executable by the processor to cause the system to: display a visual indicator of the trust score associated with the user profile alongside the posted comment, the visual indicator being dynamically updated based on changes to the trust score.

19. The system of claim 16, wherein selection of the first option causes the bias-free version of the comment to be posted.

20. A non-transitory computer-readable medium storing code for moderating comments with adaptive trust and bias detection, the code comprising instructions executable by a processor to:

receive a comment associated with a user profile of a user;

analyze the comment for sentiment and bias against predefined bias categories;

in response to detecting no bias in the comment, post the comment to a platform and update a trust score associated with the user profile based on predefined trust score rules;

in response to detecting bias in the comment, flag the comment, generate a bias-free version of the comment for acceptance and replacement with the comment, and update the trust score associated with the user profile based on predefined trust score reduction rules;

adjust user privileges associated with the user profile based on an updated trust score; and generate a notification to the user profile in response to detecting the bias in the comment, the notification including a description of a detected bias category, a first option for completing the acceptance of the bias-free version of the comment and the replacement of the comment, and a second option for canceling the comment entirely.

\* \* \* \* \*